(12) United States Patent
Lee et al.

(10) Patent No.: US 10,299,214 B2
(45) Date of Patent: May 21, 2019

(54) METHOD AND APPARATUS FOR TRIGGERING DETACH OR POWER SAVING MODE BASED ON PROXIMITY WITH DEVICE IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/525,360

(22) PCT Filed: Nov. 6, 2015

(86) PCT No.: PCT/KR2015/011917
§ 371 (c)(1),
(2) Date: May 9, 2017

(87) PCT Pub. No.: WO2016/076576
PCT Pub. Date: May 19, 2016

(65) Prior Publication Data
US 2017/0339644 A1 Nov. 23, 2017

Related U.S. Application Data

(60) Provisional application No. 62/077,847, filed on Nov. 10, 2014.

(51) Int. Cl.
*H04W 52/02* (2009.01)
*H04L 12/26* (2006.01)
(Continued)

(52) U.S. Cl.
CPC ......... *H04W 52/0245* (2013.01); *H04L 43/16* (2013.01); *H04L 65/1063* (2013.01);
(Continued)

(58) Field of Classification Search
CPC .... H04L 43/16; H04L 65/1063; H04W 24/10; H04W 4/008; H04W 52/0245;
(Continued)

(56) References Cited

U.S. PATENT DOCUMENTS

2012/0069782 A1* 3/2012 Kuo ...................... H04W 76/28
370/311
2014/0155114 A1* 6/2014 Wu ...................... H04W 76/043
455/509
(Continued)

FOREIGN PATENT DOCUMENTS

KR 10-2013-0006284 A 1/2013
WO WO-2013/090809 A1 6/2013
(Continued)

OTHER PUBLICATIONS

ETSI TS 124 301 V10.15.0 (Oct. 2014), Technical Specification, Universal Mobile Telecommunications System (UMTS); LTE; Non-Access-Stratum (NAS) protocol for Evolved Packet System (EPS); State 3 (3GPP TS 24.301 version 10.15.0 Release 10), 317 pgs.

*Primary Examiner* — Awet Haile
(74) *Attorney, Agent, or Firm* — Birch, Stewart, Kolasch & Birch, LLP

(57) ABSTRACT

A method and apparatus for performing an attach/detach procedure or activating/deactivating a power saving mode (PSM) based on proximity with a device in a wireless communication system is provided. According to an embodiment, a user equipment (UE) performs a detach procedure or activates a PSM, upon detecting proximity with another device. According to another embodiment, a UE performs an
(Continued)

attach procedure or deactivates a PSM, upon detecting non-proximity with another device.

13 Claims, 13 Drawing Sheets

(51) Int. Cl.
*H04W 24/10* (2009.01)
*H04W 4/00* (2018.01)
*H04W 8/00* (2009.01)
*H04W 60/06* (2009.01)
*H04W 76/28* (2018.01)
*H04W 76/38* (2018.01)
*H04W 4/80* (2018.01)
*H04L 29/06* (2006.01)
*H04W 88/02* (2009.01)
*H04W 92/20* (2009.01)

(52) U.S. Cl.
CPC ............. *H04W 4/80* (2018.02); *H04W 8/005* (2013.01); *H04W 24/10* (2013.01); *H04W 60/06* (2013.01); *H04W 76/28* (2018.02); *H04W 76/38* (2018.02); *H04W 88/02* (2013.01); *H04W 92/20* (2013.01); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/23* (2018.01); *Y02D 70/24* (2018.01); *Y02D 70/26* (2018.01)

(58) Field of Classification Search
CPC . H04W 76/048; H04W 76/068; H04W 76/28; H04W 76/38; H04W 88/02; H04W 8/005; H04W 92/20
See application file for complete search history.

(56) References Cited

U.S. PATENT DOCUMENTS

2015/0050882 A1* 2/2015 Ikenaga ................ H04W 12/06
    455/41.1
2016/0286491 A1* 9/2016 Haneji ............. H04W 52/0212
2018/0139578 A1* 5/2018 Xiao ......................... G01S 5/14

FOREIGN PATENT DOCUMENTS

WO    WO-2014/107091 A1    7/2014
WO    WO-2014/163372 A1    10/2014

* cited by examiner

[Fig. 1]
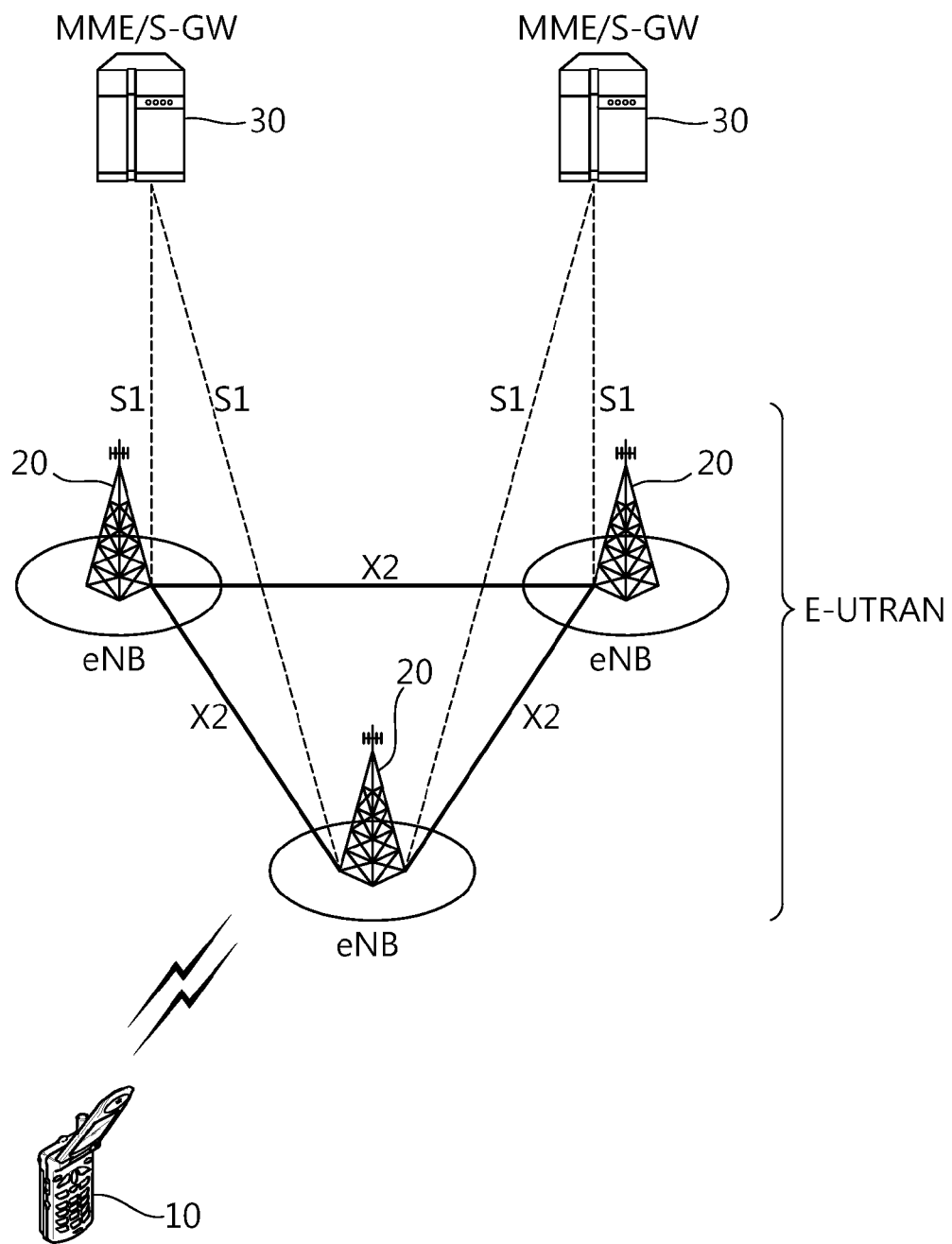

[Fig. 2]
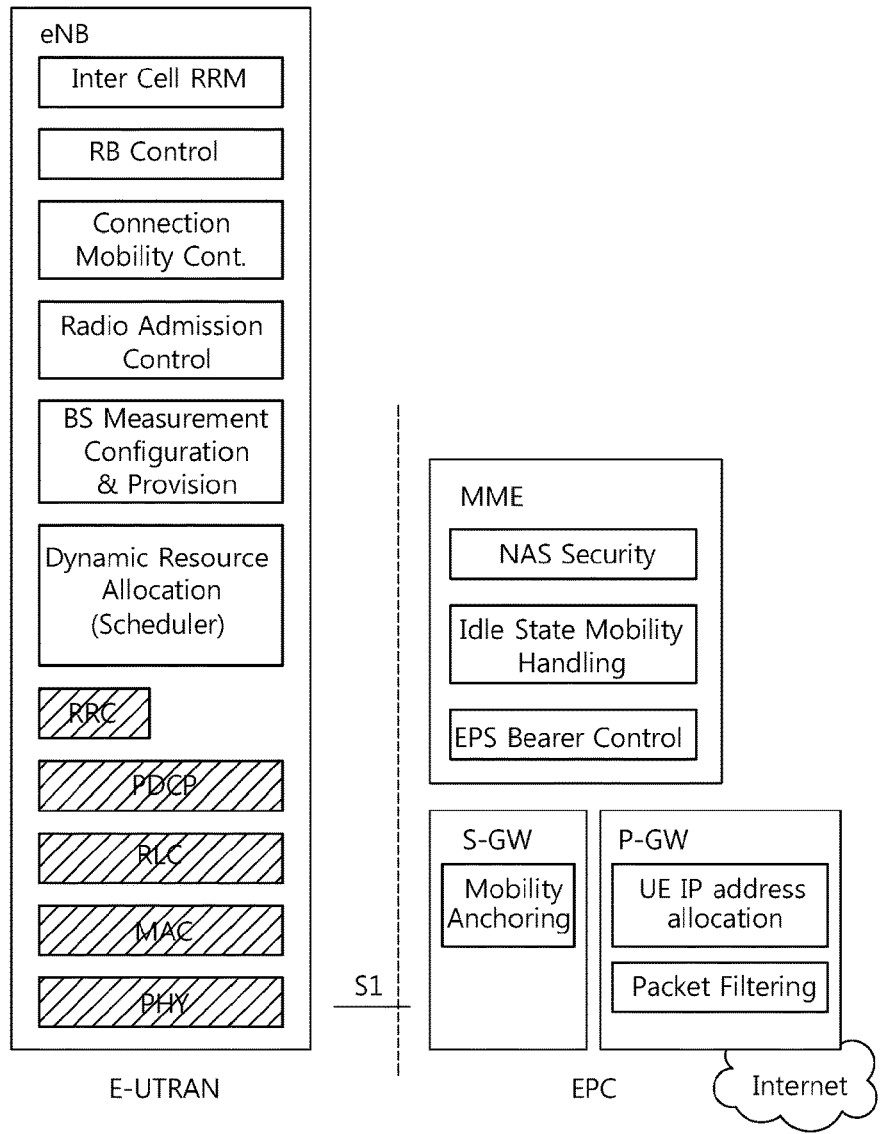
[Fig. 3]
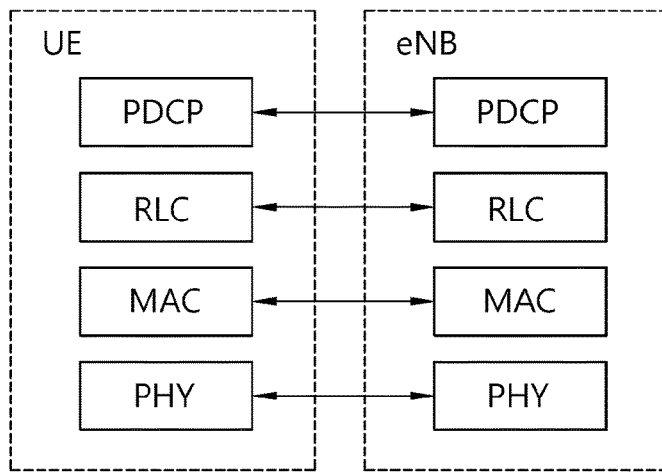

[Fig. 4]
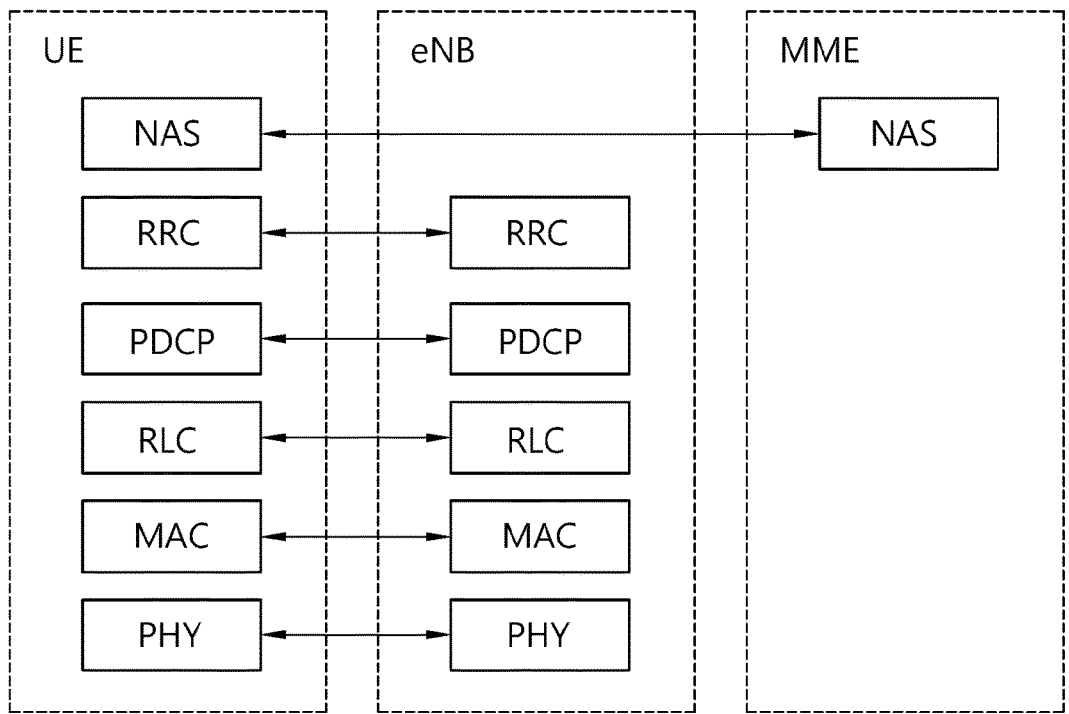
[Fig. 5]
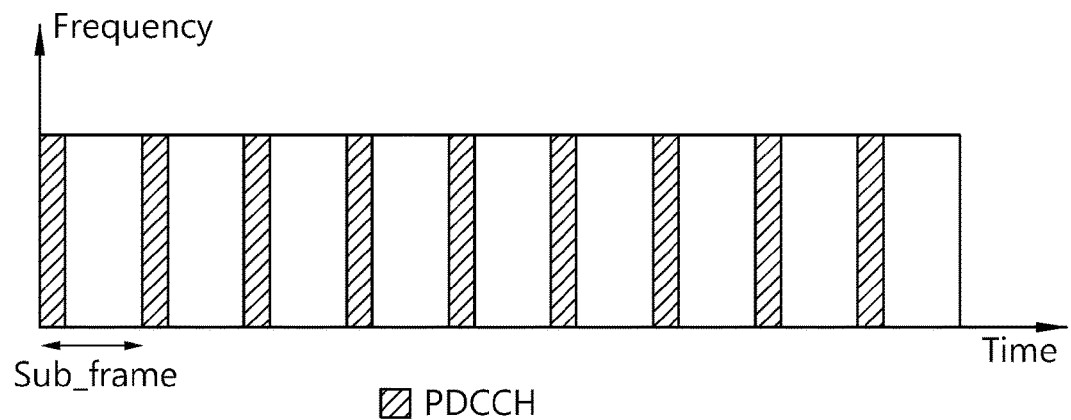

[Fig. 6]
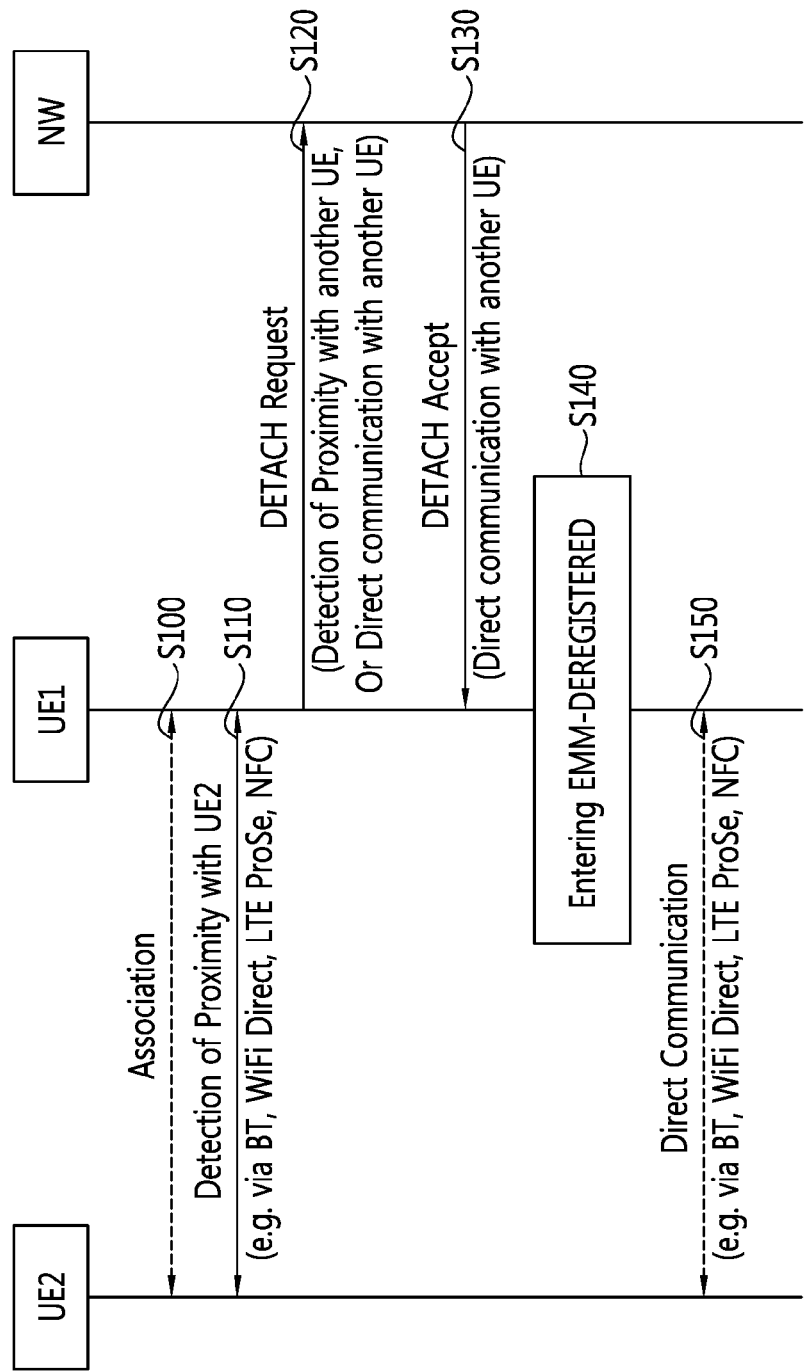

[Fig. 7]
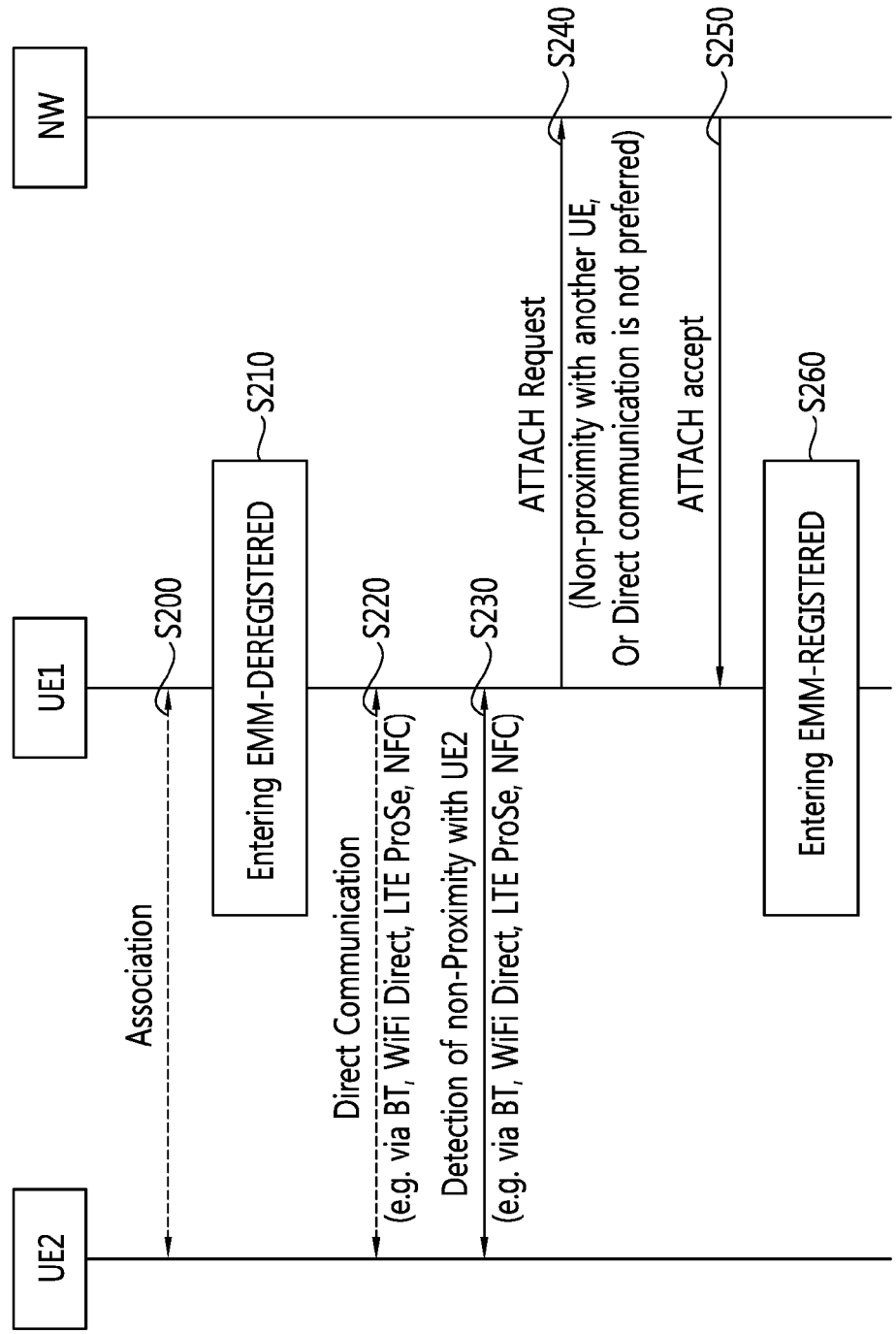

[Fig. 8]
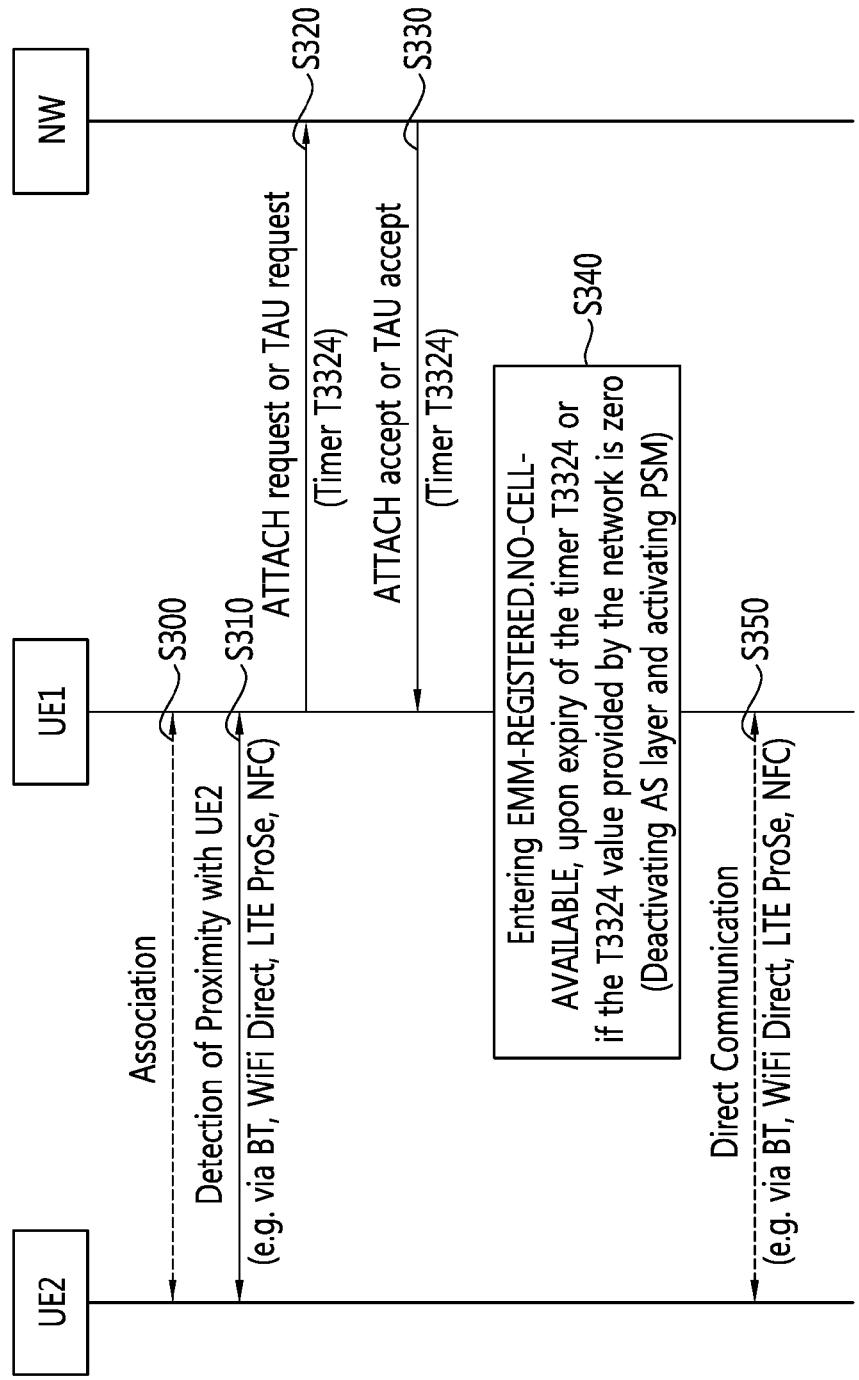

[Fig. 9]
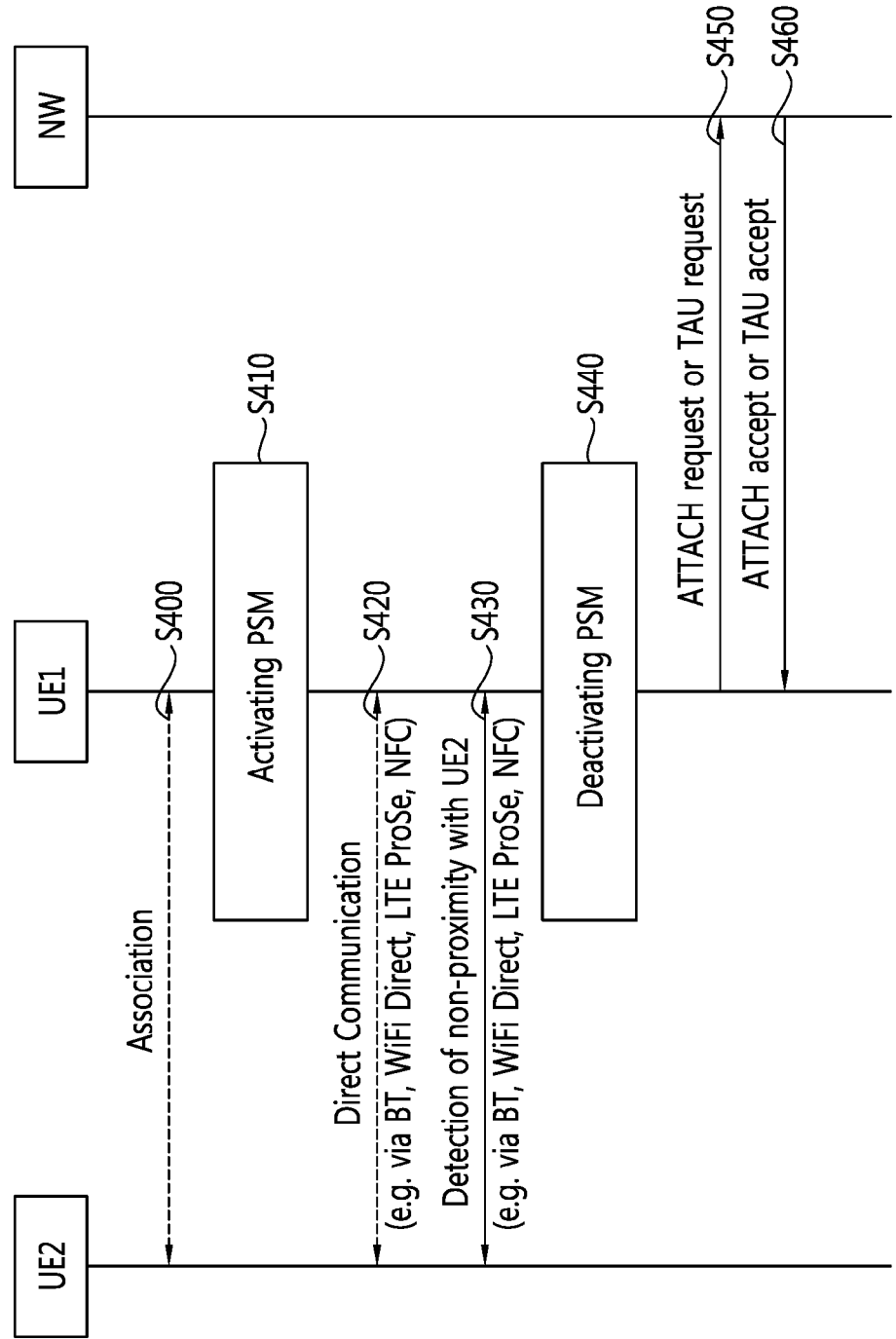

[Fig. 10]
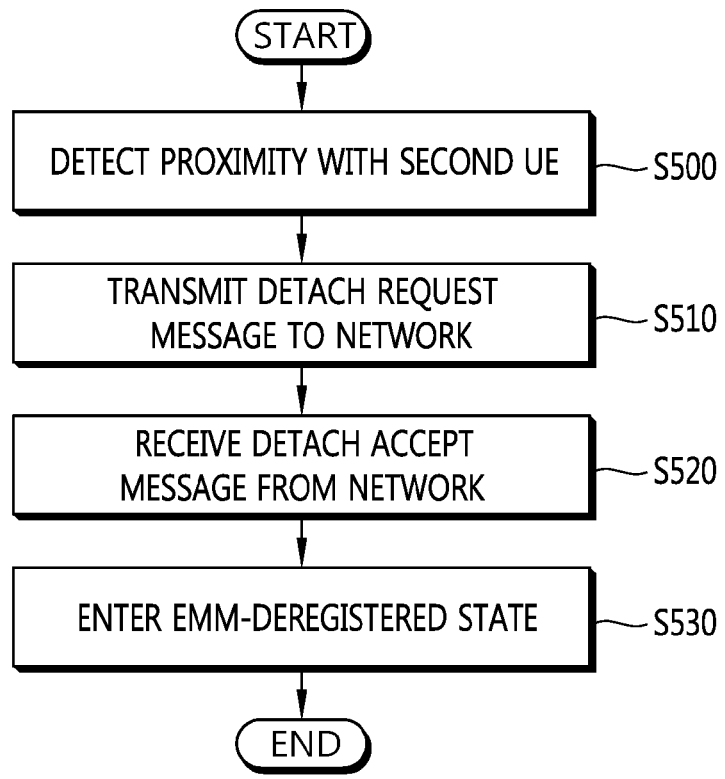
[Fig. 11]
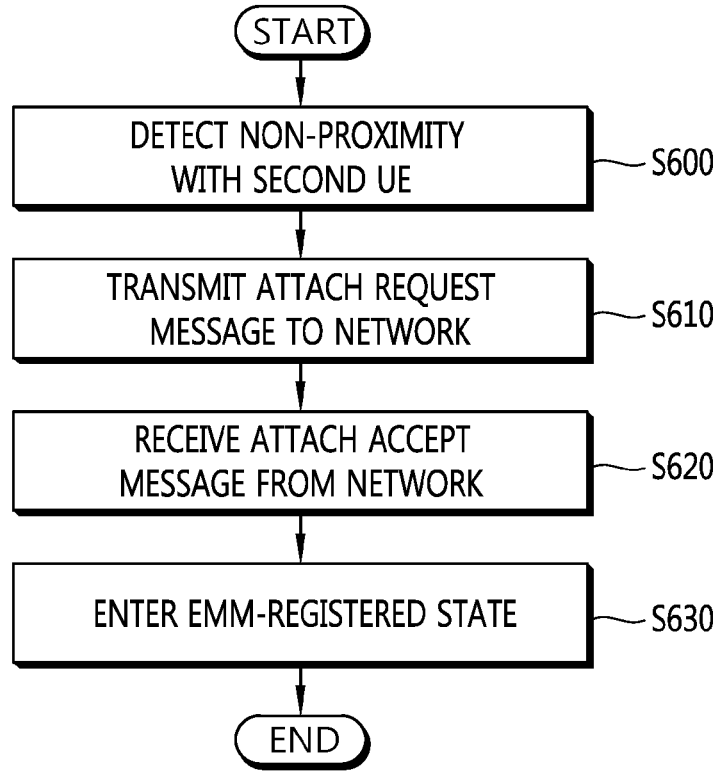

[Fig. 12]
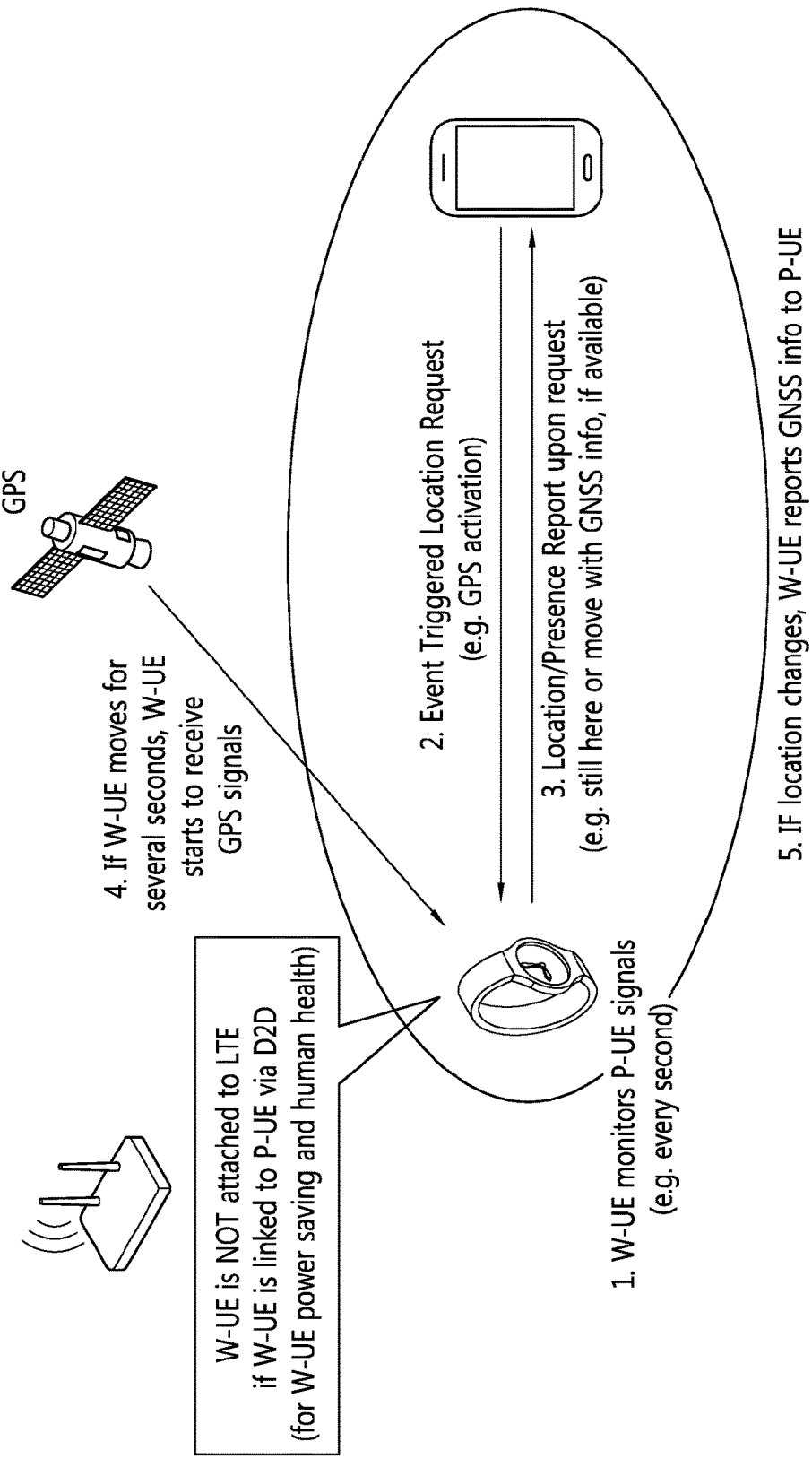

[Fig. 13]
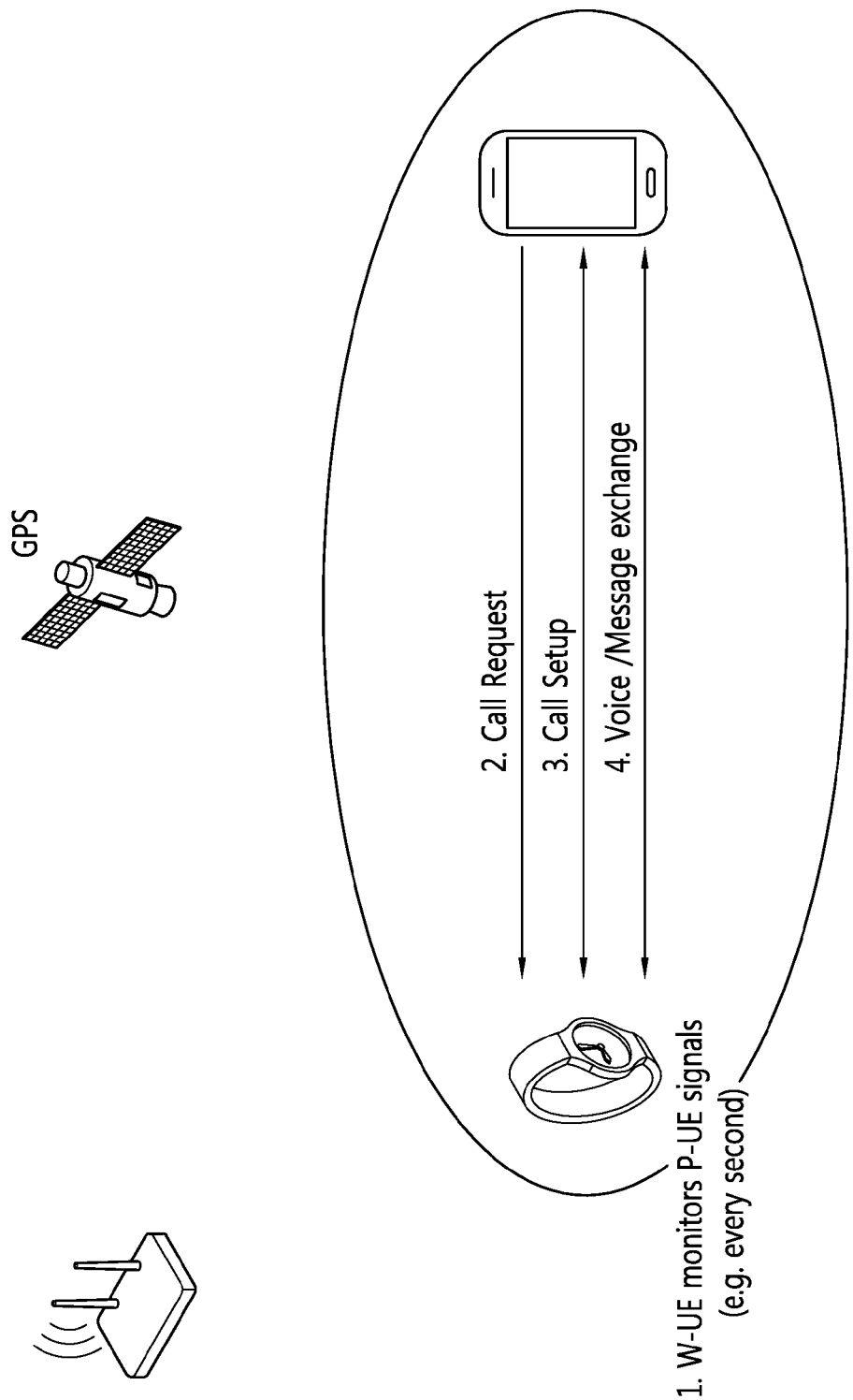

[Fig. 14]
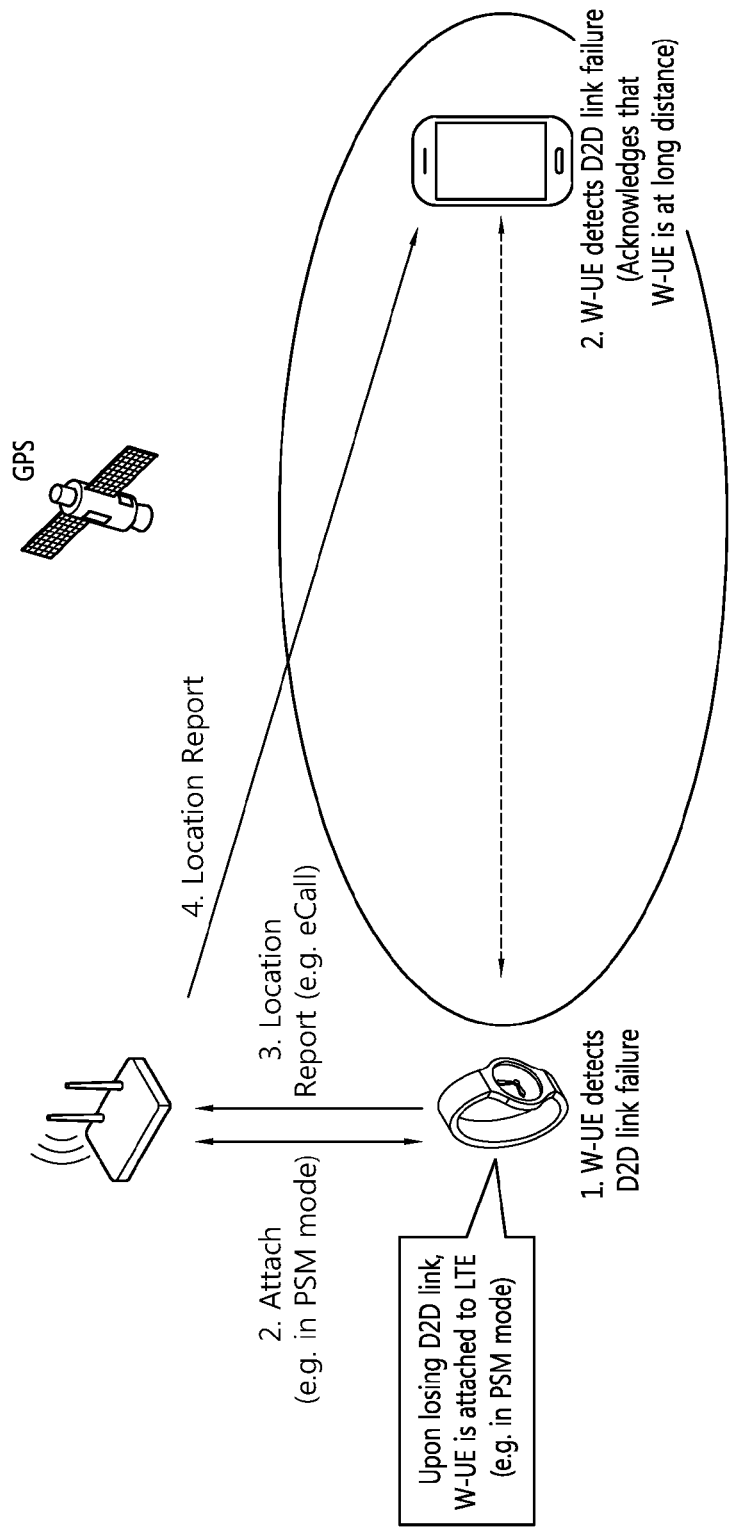

[Fig. 15]
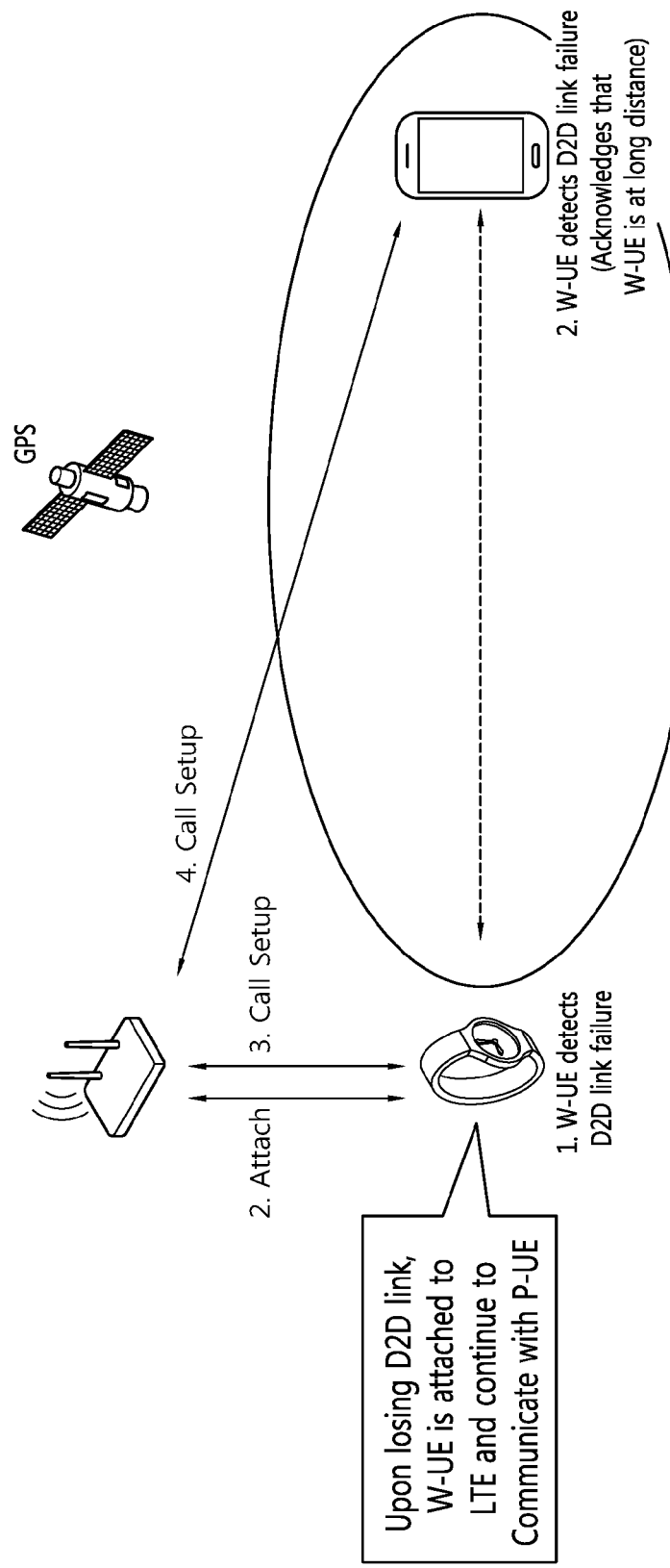

[Fig. 16]
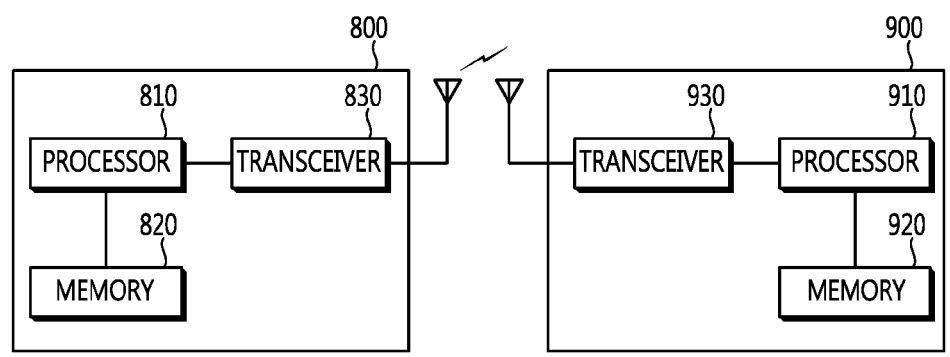

METHOD AND APPARATUS FOR TRIGGERING DETACH OR POWER SAVING MODE BASED ON PROXIMITY WITH DEVICE IN WIRELESS COMMUNICATION SYSTEM

CROSS REFERENCE TO RELATED APPLICATIONS

This application is the National Phase of PCT International Application No. PCT/KR2015/011917, filed on Nov. 6, 2015, which claims priority under 35 U.S.C. 119(e) to U.S. Provisional Application No. 62/077,847, filed on Nov. 10, 2014, all of which are hereby expressly incorporated by reference into the present application.

TECHNICAL FIELD

The present invention relates to wireless communications, and more particularly, to a method and apparatus for triggering detach or a power saving mode (PSM) based on proximity with a device in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Machine-type communication (MTC) is an important revenue stream for operators and has a huge potential from the operator perspective. There are several industry for a working on an efficient machine-to-machine (M2M) system with some industry members developing a new access technology dedicated for MTC. However, it is more efficient for operators to be able to serve MTC user equipment (UE) using already deployed radio access technology. Therefore it is important for operators to understand whether LTE could be a competitive radio access technology for efficient support of MTC. It is envisaged that MTC UE's will be deployed in huge numbers, large enough to create an ecosystem on its own. Lowering the cost of MTC UE's is an important enabler for implementation of the concept of "internet of things". MTC UE's used for many applications will require low operational power consumption and are expected to communicate with infrequent small burst transmissions. In addition, there is a substantial market for the M2M use cases of devices deployed deep inside buildings which would require coverage enhancement in comparison to the defined LTE cell coverage footprint.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

When a MTC UE can perform ProSe operations with another UE, in order to avoid waste of battery life of the MTC UE, a method for triggering detach or a power saving mode (PSM) for the MTC UE may be required.

DISCLOSURE OF INVENTION

Technical Problem

The present invention provides a method and apparatus for triggering detach or a power saving mode (PSM) based on proximity with a device in a wireless communication system. The present invention provides a method and apparatus for performing a detach procedure upon detecting proximity with another device. The present invention provides a method and apparatus for performing an attach procedure upon detecting non-proximity with another device. The present invention provides a method and apparatus for activating a PSM upon detecting proximity with another device. The present invention provides a method and apparatus for deactivating a PSM upon detecting non-proximity with another device.

Solution to Problem

In an aspect, a method for performing, by a first user equipment (UE), a detach procedure in a wireless communication system is provided. The method includes detecting proximity with a second UE, transmitting a detach request message to a network, receiving a detach accept message from the network, and entering an evolved packet system (EPS) mobility management deregistered state (EMM-DEREGISTERED).

In another aspect, a method for performing, by a first user equipment (UE), an attach procedure in a wireless communication system is provided. The method includes detecting non-proximity with a second UE, transmitting an attach request message to a network, receiving an attach accept message from the network, and entering an evolved packet system (EPS) mobility management registered state (EMM-REGISTERED).

Advantageous Effects of Invention

Waste of battery power by unnecessary communication may be avoided.

BRIEF DESCRIPTION OF DRAWINGS

FIG. 1 shows LTE system architecture.
FIG. 2 shows a block diagram of architecture of a typical E-UTRAN and a typical EPC.
FIG. 3 shows a block diagram of a user plane protocol stack of an LTE system.

FIG. 4 shows a block diagram of a control plane protocol stack of an LTE system.

FIG. 5 shows an example of a physical channel structure.

FIG. 6 shows a method for performing a detach procedure according to an embodiment of the present invention.

FIG. 7 shows a method for performing an attach procedure according to an embodiment of the present invention.

FIG. 8 shows a method for activating a PSM according to an embodiment of the present invention.

FIG. 9 shows a method for deactivating a PSM according to an embodiment of the present invention.

FIG. 10 shows a method for performing a detach procedure according to another embodiment of the present invention.

FIG. 11 shows a method for performing an attach procedure according to another embodiment of the present invention.

FIG. 12 shows a D2D-based location tracking in a short distance according to an embodiment of the present invention.

FIG. 13 shows a D2D-based telephony in a short distance according to an embodiment of the present invention.

FIG. 14 shows a network-based location tracking in a long distance according to an embodiment of the present invention.

FIG. 15 shows a network-based telephony in a long distance according to an embodiment of the present invention.

FIG. 16 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical

EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

A NAS layer belongs to a higher layer of the RRC layer and serves to perform session management, mobility management, etc.

To manage mobility of the UE in the NAS layer, two states are defined, i.e. an evolved packet system (EPS) mobility management registered state (EMM_REGISTERED) and an EMM deregistered state (EMM_DEREGISTERED). These two states apply to the UE and the MME. Initially, the UE is in the EMM_DEREGISTERED. To access a network, the UE performs a procedure of registering to the network through an initial attach procedure. If the attach procedure is successfully completed, the UE and the MME enter the EMM_REGISTERED.

To manage a signaling connection between the UE and the EPC, two states are defined, i.e. an EPS connection management (ECM) idle state (ECM_IDLE) and an ECM connected state (ECM_CONNECTED). These two states apply to the UE and the MME. When a UE in the ECM IDLE establishes an RRC connection with the E-UTRAN, the UE enters the ECM_CONNECTED. When an MME in the ECM_IDLE establishes an S1 connection with the E-UTRAN, the MME enters the ECM_CONNECTED. When the UE is in the ECM_IDLE, the E-UTRAN does not have context information of the UE. Therefore, the UE in the ECM_IDLE performs a UE-based mobility related procedure such as cell selection or reselection without having to receive a command of the network. On the other hand, when the UE is in the ECM_CONNECTED, mobility of the UE is managed by the command of the network. If a location of the UE in the ECM IDLE becomes different from a location known to the network, the UE reports the location of the UE to the network through a tracking area update procedure.

Machine-type communications (MTC) are described. As LTE deployments evolve, operators would like to reduce the cost of overall network maintenance by minimizing the number of RATs. MTC is a market that is likely to continue expanding in the future. Many MTC UE's are targeting low-end (low average revenue per user, low data rate) applications that can be handled adequately by GSM/GPRS. Owing to the low-cost of these devices and good coverage of GSM/GPRS, there is very little motivation for MTC UE suppliers to use modules supporting the LTE radio interface. As more and more MTC UE's are deployed in the field, this naturally increases the reliance on GSM/GPRS networks. This will cost operators not only in terms of maintaining multiple RATs, but it will also prevent operators from reaping the maximum benefit out of their spectrum (given the non-optimal spectrum efficiency of GSM/GPRS). Given the likely high number of MTC UE's, the overall resource they will need for service provision may be correspondingly significant, and inefficiently assigned. Therefore, it is necessary to find a solution to ensure that there is a clear business benefit to MTC UE vendors and operators for migrating low-end MTC UE's from GSM/GPRS to LTE networks.

In LTE, a cell bandwidth may be scalable. A LTE cell may support one of 1.4 MHz, 3 MHz, 5 MHz, 10 MHz, 15 MHz or 20 MHz. If the UE supports LTE, the UE should support at least 20 MHz cell bandwidth. The UE supporting LTE (hereinafter, LTE UE) may work with any cell bandwidth. But, all LTE UEs should work in a cell of 20 MHz bandwidth. Namely, 20 MHz is the minimum UE capability that LTE UE should support.

Meanwhile, MTC UE is considered as low cost device on the market normally. The fact that LTE UE should support at least 20 MHz may increase cost of MTC UE supporting LTE. Thus, it may be considered that if LTE UE operates as a MTC UE, this type of LTE UE may reduce supported cell bandwidth. For instance, MTC UE in LTE may support only 1.4 MHz, 3 MHz, or 5 MHz bandwidth. Or, the MTC UE in LTE may be considered as a lower category such as UE category 0.

UE power saving mode (PSM) is described. A UE may adopt a PSM. If a UE is capable of adopting a PSM and it wants to use the PSM, it shall request an active time value and may request a periodic TAU/routing area update (RAU) timer value during every attach and TAU procedures. The UE shall not request a periodic TAU/RAU timer value if it is not requesting an active time value. The network shall not allocate an active time value if the UE has not requested it. PSM has no support in the circuit switch (CS) domain on the network side. When the PSM is activated, the UE might not be available for paging of mobile terminated CS services even though the UE is registered in the CS domain.

If the network allocates an active time value, the UE starts the active timer and the MME starts the mobile reachable timer with the active time value allocated by the network when transitioning from ECM_CONNECTED to ECM_IDLE. The UE shall stop the active timer, if running, when a transition to ECM_CONNECTED mode is made. When the active timer expires, the UE deactivates its AS functions and enters PSM. In PSM, due to deactivation of AS functions, the UE stops all idle mode procedures, but continues to run any NAS timers that may apply, e.g. the periodic TAU timer. The UE shall resume AS functions and idle mode procedures before the periodic TAU timer expires for performing the periodic TAU procedure as applicable.

The UE may resume idle mode procedures and AS functions any time while in PSM, e.g. for mobile originated communications. Any timers and conditions that remain valid during power-off, e.g. for NAS-level back-off, apply in the same way during PSM. When the mobile reachable timer expires and the MME stores an active time for the UE, the MME knows that the UE entered PSM and is not available for paging. On UE side, the PSM complies with some substates of EMM_REGISTERED. The MME considers the UE to be EMM_REGISTERED, but not reachable. The UE's AS functions are considered as deactivated during PSM. When the UE has bearers for emergency services, the UE shall not apply PSM.

The UE can request the use of PSM during an attach or tracking area updating procedure. The UE shall not request the use of PSM during:

An attach for emergency bearer services procedure;
An attach procedure for initiating a PDN connection for emergency bearer services with attach type not set to "EPS emergency attach";
A tracking area updating procedure for initiating a PDN connection for emergency bearer services; or
A tracking area updating procedure when the UE has a PDN connection established for emergency bearer services.

The network accepts the use of PSM by providing a specific value for timer T3324 when accepting the attach or tracking area updating procedure. The UE may use PSM only if the network has provided the T3324 value information element (IE) during the last attach or tracking area updating procedure with a value different from "de-activated".

Upon expiry of the timer T3324 or if the T3324 value provided by the network is zero, the UE may deactivate the AS layer and activate PSM by entering the state EMM-REGISTERED.NO-CELL-AVAILABLE if:

a) the UE is not attached for emergency bearer services;
b) the UE has no PDN connection for emergency bearer services;
c) the UE is in EMM-IDLE mode; and
d) in the EMM-REGISTERED.NORMAL-SERVICE state.

The state EMM-REGISTERED.NO-CELL-AVAILABLE means that E-UTRAN coverage has been lost or PSM is active in the UE. If PSM is active, the UE can de-activate PSM at any time by activating the AS layer when the UE needs to send mobile originated signaling or user data. Otherwise, the UE shall not initiate any EMM procedure except for cell and PLMN reselection.

If conditions a, b and c are fulfilled, but the UE is in a state other than EMM-REGISTERED.NORMAL-SERVICE when timer T3324 expires, the UE may activate PSM when the UE returns to state EMM-REGISTERED.NORMAL-SERVICE.

A UE that has already been allocated timer T3324 with a value different from "de-activated" and the timer T3324 has expired, may activate PSM if it receives an "Extended wait time" from lower layers. If the UE is attached for emergency bearer services or has a PDN connection for emergency bearer services, the UE shall not activate PSM. The UE may deactivate PSM at any time (e.g. for the transfer of mobile originated signaling or user data), by activating the AS layer before initiating the necessary EMM procedures. When PSM is activated all NAS timers are stopped and associated procedures aborted except for T3412, T3346 and T3396.

A user may have multiple devices such as smart phone, smart car and smart watch. This user may normally want to use a mobile service such as voice call, streaming, internet, web search or application only by using one device at a time. In this case, devices that the user is not using may waste their battery power to unnecessarily perform communication, e.g. for signaling procedure.

In order solve the problem described above, according to an embodiment of the present invention, a method for performing an attach/detach procedure based on proximity may be proposed. In this embodiment, when two different UEs are associated, e.g. by application, a first UE may be detached from the network and enters EMM_DEREGISTERED, upon detecting proximity with a second UE. Or, the first UE that has already been detached from the network may be attached to the network, upon detecting non-proximity with a second UE. Alternatively, according to another embodiment of the present invention, a method for activating/deactivating a PSM based on proximity may be proposed. In this embodiment, when two different UEs are associated, a first UE may activate a PSM, upon detecting proximity with a second UE. Or, the first UE that has already activated a PSM may deactivate a PSM, upon detecting non-proximity with a second UE.

First, a method for performing an attach/detach procedure based on proximity according to an embodiment of the present invention is described.

FIG. 6 shows a method for performing a detach procedure according to an embodiment of the present invention. In this embodiment, the UE may be detached from the network based on proximity with another UE. In this embodiment, the first UE may be one of a smartphone or a wearable device, such as a smart watch/glasses/cap. The second UE may be a smartphone.

In step S100, the first UE and the second UE are associated, e.g. by application.

In step S110, the first UE determines detection of proximity with the second UE.

That is, the first UE determines entering proximity with the second UE. For the detection, the first UE may measure a signal transmitted by the second UE. If the measured signal strength is higher than a threshold, the first UE may determine detection of the proximity with the second UE. The threshold may be given by the network or an application server. The signal may correspond to a signal in Bluetooth, Wi-Fi Direct, LTE proximity-based services (ProSe) communication/discovery, or near field communication (NFC).

In step S120, upon detection of proximity with the second UE, the first UE requests direct communication with another UE (i.e. the second UE associated with the first UE) by transmitting a DETACH request message to the network. The first UE may also indicate to the network via the DETACH request message that the first UE is in proximity with another UE such as the second UE.

In step S130, the first UE receives a NAS message such as a DETACH accept message indicating direct communication with another UE from the network. The network may indicate direct communication with another UE, only if the network allows the first UE to perform direct communication with another UE instead of using infra-network.

In step S140, the first UE enters EMM-DEREGISTERED. In step S150, the first UE may begin to perform direct communication with the second UE, while detaching from the network.

FIG. 7 shows a method for performing an attach procedure according to an embodiment of the present invention. In this embodiment, the UE may be attached to the network based on non-proximity with another UE. In this embodiment, the first UE may be one of a smartphone or a wearable device, such as a smart watch/glasses/cap. The second UE may be a smartphone.

In step S200, the first UE and the second UE are associated, e.g. by application. In step S210, the first UE enters EMM_DEREGISTERED. In step S220, the first UE performs direct communication with the second UE, while detaching from the network.

In step S230, the first UE determines detection of non-proximity with the second UE or detection of failure of direct communication with the second UE. That is, the first UE determines leaving proximity with the second UE. For the detection, the first UE may measure a signal transmitted by the second UE. If the measured signal strength is lower than a threshold, the first UE may determine detection of the non-proximity with the second UE. The threshold may be given by the network or an application server. The signal may correspond to a signal in Bluetooth, Wi-Fi Direct, LTE ProSe communication/discovery, or NFC.

In step S240, upon detection of non-proximity with the second UE, the first UE transmits a NAS message such as an ATTACH request message to the network in order to be attached to the network. The NAS message may indicate to the network that non-proximity with another UE (e.g. the second UE) is detected, or direct communication with another UE is failed, or direct communication with another UE is not preferred.

In step S250, the first UE receives a NAS message such as an ATTACH accept message from the network. The network may accept the attach request of the first UE, if the network allows the first UE to stop (on-going) direct communication with another UE. The network may inform the first UE in the ATTACH accept message whether or not direct communication with another UE is allowed in EMM_REGISTERED.

In step S260, the first UE enters EMM_REGISTERED. The first UE may perform communication with the network, e.g. possibly for communication with the second UE based on infra-network.

Second, a method for activating/deactivating a PSM based on proximity according to an embodiment of the present invention is described.

FIG. 8 shows a method for activating a PSM according to an embodiment of the present invention. In this embodiment, the UE may activate a PSM based on proximity with another UE. In this embodiment, the first UE may be one of a smartphone or a wearable device, such as a smart watch/glasses/cap. The second UE may be a smartphone.

In step S300, the first UE and the second UE are associated, e.g. by application.

In step S310, the first UE determines detection of proximity with the second UE. That is, the first UE determines entering proximity with the second UE. For the detection, the first UE may measure a signal transmitted by the second UE. If the measured signal strength is higher than a threshold, the first UE may determine detection of the proximity with the second UE. The threshold may be given by the network or an application server. The signal may correspond to a signal in Bluetooth, Wi-Fi Direct, LTE ProSe communication/discovery, or NFC.

In step S320, upon detection of proximity with the second UE, the first UE transmits a NAS message such as an ATTACH request message or a TAU request message to the network in order to activate PSM. The NAS message may include a timer value to request PSM, i.e. T3324. The timer value may be requested by the first UE.

In step S330, the first UE receives a NAS message such as an ATTACH accept message or a TAU accept message from the network. The NAS message may include a timer value to activate PSM, i.e. T3324. The network may determine the timer value based on the request from the first UE.

In step S340, the first UE activates PSM upon expiry of the timer (i.e. T3324) or if the timer value is zero. That is, first UE enters EMM-REGISTERED.NO-CELL-AVAILABLE. During PSM, the first UE deactivates AS layer to save its battery power. Alternatively, instead of activating PSM, the first UE may reconfigure longer paging DRX cycle length than the currently configured paging DRX cycle length either autonomously or by requesting this reconfiguration to the eNB. When the first UE autonomously reconfigures longer paging DRX cycle length, the MME may inform the eNB about this reconfiguration, so that the first UE and the eNB will live with the same reconfiguration. In step S350, the first UE may perform direct communication with the second UE, while deactivating communication with the network in PSM.

FIG. 9 shows a method for deactivating a PSM according to an embodiment of the present invention. In this embodiment, the UE may deactivate a PSM based on non-proximity with another UE. In this embodiment, the first UE may be one of a smartphone or a wearable device, such as a smart watch/glasses/cap. The second UE may be a smartphone.

In step S400, the first UE and the second UE are associated, e.g. by application. In step S410, the first UE activates PSM. In step S420, the first UE performs direct communication with the second UE, while deactivating communication with the network in PSM.

In step S430, the first UE determines detection of non-proximity with the second UE. That is, the first UE determines leaving proximity with the second UE. For the detection, the first UE may measure a signal transmitted by the second UE. If the measured signal strength is lower than a threshold, the first UE may determine detection of the non-proximity with the second UE. The threshold may be given by the network or an application server. The signal may correspond to a signal in Bluetooth, Wi-Fi Direct, LTE ProSe communication/discovery, or NFC.

In step S440, upon detection of non-proximity with the second UE, the first UE transmits a NAS message such as an ATTACH request message or a TAU request message to the network in order to deactivate PSM. In step S450, the first UE receives a NAS message such as an ATTACH accept message or a TAU accept message from the network. In step S460, the first UE deactivates PSM.

FIG. 10 shows a method for performing a detach procedure according to another embodiment of the present invention.

In step S500, the first UE detects proximity with a second UE. Detecting the proximity with the second UE may include measuring a signal transmitted from the second UE, and determining that a strength of the measured signal is higher than a threshold. The threshold may be provided by the network or an application server. The signal may correspond to a signal in one of Bluetooth, Wi-Fi Direct, LTE ProSe communication or discovery, or NFC.

In step S510, the first UE transmits a detach request message to a network. The detach request message may indicate a request of a direct communication with the second UE. The detach request message may indicate that the first UE is in proximity with the second UE.

In step S520, the first UE receives a detach accept message from the network. The detach accept message may indicate a direct communication with the second UE. The detach accept message may indicate that the network allows the first UE to perform the direct communication with the second UE.

In step S530, the first UE enters EMM-DEREGISTERED. The first UE may perform a direct communication with the second UE while detaching from the network.

FIG. 11 shows a method for performing an attach procedure according to another embodiment of the present invention.

In step S600, the first UE detects non-proximity with a second UE. Detecting the non-proximity with the second UE may include measuring a signal transmitted from the second UE, and determining that a strength of the measured signal is lower than a threshold. The threshold may be provided by the network or an application server. The signal may correspond to a signal in one of Bluetooth, Wi-Fi Direct, LTE ProSe communication or discovery, or NFC.

In step S610, the first UE transmits an attach request message to a network. The attach request message may indicate that the non-proximity with the second UE is detected, or a direct communication with the second UE is failed, or the direct communication with the second UE is not preferred.

In step S620, the first UE receives an attach accept message from the network. The attach accept message may indicate that the network allows the first UE to stop a direct communication with the second UE. The attach accept message may indicate whether or not a direct communication with the second UE is allowed in EMM-REGISTERED.

In step S630, the first UE enters EMM-REGISTERED. The first UE may perform a communication with the network for a communication with the second UE.

Hereinafter, use cases of detection of a lost person or a lost device according to an embodiment of the present invention are described. The use cases may include a case when a UE is detached from the network or activates a PSM upon detecting proximity with another UE, as described in FIG. 6, FIG. 8 and FIG. 10 above. The use cases may also include a case when a UE is attached to the network or deactivates a PSM upon detecting non-proximity with another UE, as described in FIG. 7, FIG. 9 and FIG. 11 above. Hereinafter, it is assumed that a protector UE (P-UE) may be connected to a wearable UE (W-UE) via LTE-Ud (i.e. device-to-device (D2D) connection) with a distance of e.g. hundreds of meters. Further, it is assumed that the P-UE and W-UE may be connected to the network via LTE-Uu. The W-UE may support PSM.

FIG. 12 shows a D2D-based location tracking in a short distance according to an embodiment of the present invention. Referring to FIG. 12, the W-UE is not attached to the network since the W-UE is linked to the P-UE via D2D. The W-UE may activate PSM. The W-UE monitors signals of the P-UE (e.g. every second). The P-UE transmits an event-triggered location request (e.g. global positioning system (GPS) activation) to the W-UE. Upon receiving the location request, the W-UE transmits a location/presence report (e.g. still here or move with global navigation satellite system (GNSS) information, if available) to the P-UE. If the W-UE moves for several seconds, the W-UE starts to receive GPS signals. If location of the W-UE changes, the W-UE reports GNSS information to the P-UE. Accordingly, the P-UE can acknowledge presence of the W-UE in a short distance via D2D without help of the network.

FIG. 13 shows a D2D-based telephony in a short distance according to an embodiment of the present invention. Referring to FIG. 13, the W-UE is not attached to the network since the W-UE is linked to the P-UE via D2D. The W-UE may activate PSM. The W-UE monitors signals of the P-UE (e.g. every second). The P-UE transmits a call request/setup to the W-UE, and the P-UE and W-UE can exchange voice/message. Accordingly, the P-UE can communicate with the W-UE (e.g. voice/message) in a short distance via D2D without help of the network. Voice/message can be provided to the W-UE when the W-UE is out of LTE coverage or at a boundary of LTE coverage.

FIG. 14 shows a network-based location tracking in a long distance according to an embodiment of the present invention. Referring to FIG. 14, the P-UE and W-UE detect D2D connection failure. Upon losing D2D connection with the P-UE, the W-UE is attached to the network (e.g. in PSM). The W-UE transmits a location report (e.g. eCall) to the network, and the network forwards the location report to the P-UE. That is, if the W-UE gets out of a long distance from the P-UE, the W-UE may forward the location report to the P-UE by attaching to the network. In this case, power saving and healthcare may be supported by PSM.

FIG. 15 shows a network-based telephony in a long distance according to an embodiment of the present invention. Referring to FIG. 15, while exchanging voice/message, the P-UE and W-UE detect D2D connection failure. Upon losing D2D connection with the P-UE, the W-UE is attached to the network and continues to communication with the P-UE by setting up call via the network. That is, if the W-UE gets out of a long distance from the P-UE while exchanging voice/message, the W-UE may set up call to the P-UE by attaching to the network.

FIG. 16 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing, by a first user equipment (UE), a power saving mode (PSM) mode activation in a wireless communication system, the method comprising:
   determining whether to enter or leave a proximity state with a second UE, based on a measured signal received from the second UE;
   transmitting a first non-access stratum (NAS) message requesting for activation of the PSM to a network, when it is determined to enter the proximity state with the second UE;
   transmitting a second NAS message requesting for deactivation of the PSM to the network, when it is determined to leave the proximity state with the second UE; and
   receiving a third NAS message in response to the first NAS message or the second NAS message from the network.

2. The method of claim 1, wherein the determining whether to enter or leave the proximity state with the second UE comprises:
   measuring a signal transmitted from the second UE; and
   determining whether a strength of the measured signal is higher than a threshold.

3. The method of claim 2, wherein the threshold is provided by the network or an application server.

4. The method of claim 2, wherein the signal corresponds to a signal in one of Bluetooth, Wi-Fi Direct, long-term evolution (LTE) proximity-based services (ProSe) communication or discovery, or near field communication (NFC).

5. The method of claim 1, wherein the first NAS message is a tracking area update (TAU) request message, and the third NAS message is a TAU accept message.

6. The method of claim 1, wherein the first NAS message includes a first timer value requested by the first UE.

7. The method of claim 6, wherein the third NAS message includes a second timer value determined by the network based on the first timer value.

8. The method of claim 7, further comprising activating the PSM, upon expiry of the second timer value or the second timer value is 0.

9. The method of claim 8, further comprising deactivating an access stratum (AS) layer during the PSM.

10. The method of claim 1, further comprising reconfiguring a paging discontinuous reception (DRX) cycle length longer than a current paging DRX cycle length autonomously.

11. The method of claim 1, further comprising requesting reconfiguration of a paging discontinuous reception (DRX) cycle length longer than a current paging DRX cycle length to the network.

12. The method of claim 1, further comprising performing a direct communication with the second UE.

13. A first user equipment (UE) in a wireless communication system, the first UE comprising:
   a memory;
   a transceiver; and
   a processor, coupled to the memory and the transceiver, that:
      determines whether to enter or leave a proximity state with a second UE, based on a measured signal received from the second UE,
      controls the transceiver to transmit a first non-access stratum (NAS) message requesting for activation of a power saving mode (PSM) to a network, when it is determined to enter the proximity state with the second UE,
      controls the transceiver to transmit a second NAS message requesting for deactivation of the PSM to the network, when it is determined to leave the proximity state with the second UE, and
      controls the transceiver to receive a third NAS message in response to the first NAS message or the second NAS message from the network.

* * * * *